United States Patent
Rau et al.

(10) Patent No.: US 7,082,600 B1
(45) Date of Patent: Jul. 25, 2006

(54) METHOD AND APPARATUS FOR INTEGRATING A COMPUTER APPLICATION PROGRAMMING LANGUAGE RUNTIME ENVIRONMENT WITH AN OPERATING SYSTEM KERNEL

(75) Inventors: Lawrence R. Rau, Dublin, NH (US); Craig F. Newell, Lowell, MA (US); Frank E. Barrus, New Ipswich, NH (US); Matthew J. Catino, Windham, NH (US)

(73) Assignee: SavaJe Technologies, Inc., Chelmsford, MA (US)

( * ) Notice: Subject to any disclaimer, the term of this patent is extended or adjusted under 35 U.S.C. 154(b) by 648 days.

(21) Appl. No.: 10/287,856

(22) Filed: Nov. 4, 2002

(51) Int. Cl.
*G06F 9/45* (2006.01)

(52) U.S. Cl. .................. 717/148; 717/140; 717/159

(58) Field of Classification Search .......... 717/148, 717/158, 130, 177, 128, 127, 101, 115, 124, 717/152, 131, 106–108; 719/315, 316, 310, 719/318; 709/220, 224, 214, 223, 201, 206, 709/217, 246; 718/100, 108; 703/25, 3, 703/100, 7, 10

See application file for complete search history.

(56) References Cited

U.S. PATENT DOCUMENTS

| | | | |
|---|---|---|---|
| 5,247,673 A | | 9/1993 | Costa et al. |
| 5,421,015 A | | 5/1995 | Khoyi et al. |
| 5,524,253 A | | 6/1996 | Pham et al. |
| 5,684,955 A | * | 11/1997 | Meyer et al. ........ 719/316 |
| 5,764,984 A | | 6/1998 | Loucks |
| 5,805,899 A | | 9/1998 | Evans et al. |
| 6,209,021 B1 | | 3/2001 | Ahimovic et al. |
| 6,272,519 B1 | | 8/2001 | Shearer et al. |
| 6,282,702 B1 | * | 8/2001 | Ungar ........ 717/148 |
| 6,366,876 B1 | * | 4/2002 | Looney ........ 703/25 |
| 6,374,286 B1 | * | 4/2002 | Gee et al. ........ 718/108 |
| 6,418,444 B1 | * | 7/2002 | Raduchel et al. ....... 707/103 Z |
| 6,735,765 B1 | | 5/2004 | Schumacher |
| 6,842,759 B1 | * | 1/2005 | Haggar et al. ........ 707/103 R |
| 6,871,344 B1 | | 3/2005 | Grier et al. |
| 6,898,727 B1 | | 5/2005 | Wang et al. |
| 2003/0079213 A1 | * | 4/2003 | Cabillic et al. ........ 717/158 |

OTHER PUBLICATIONS

"The CLDC HotSpot™ Implementation Virtual Machine," Sun Microsystems White Paper, Jun. 2002, 19 pp.

"The Java HotSpot™ Virtual Machine, V1.4.1, d2," A Technical White Paper, Sun Microsystems, Sep. 2002, 28 pp.

(Continued)

*Primary Examiner*—Wei Zhen
*Assistant Examiner*—Anna Deng
(74) *Attorney, Agent, or Firm*—Hamilton, Brook, Smith & Reynolds, P.C.

(57) ABSTRACT

An application programming language runtime environment is integrated with an operating system kernel. The resulting merged data structures, meta-data structures and access methods contain the consolidation of information needed by the application programming language runtime and the operating system, without duplication. Integrating resources of the application programming language runtime and the operating system reduces the overall memory needed to store the merges data structures and meta data structures. Additionally, overhead in maintaining multiple data structures in parallel is also reduced, thus reducing the processing required. The integrated application programming language runtime and operating system kernel environment can also sharing semantic behavior such that untrusted application program code is prevented from escaping the application programming language runtime environment.

18 Claims, 7 Drawing Sheets

OTHER PUBLICATIONS

"The Oberon Programming Language," http://www.engin.umd.umich.edu/CIS/course.des/cis400/oberon/oberon.html, downloaded Oct. 23, 2002, 2 pp.

"The Programming Language Oberon," http://www.mathematik.uni-ulm.de/oberon/reports/report-1992.html, downloaded Oct. 23, 2002, 19 pp.

"The design of the Inferno virtual machine," http://www.vitanuova.com/inferno/papers/hotchips.html, downloaded Dec. 3, 2002, 4 pp.

Dorward, S. et al., "The Inferno Operating System," http://www.vitanuova.com/inferno/papers/bltj.html, downloaded Dec. 3, 2002, 17 pp.

Swinehart, D.C. et al., "A Structural View of the Cedar Programming Environment," *ACM Transactions on Programming Languages and Systems*, vol. 8, No. 4, Oct. 1986, pp. 419-490.

Teitelman, W., "A Tour Through Cedar," *IEEE SOFTWARE*, Apr. 1984, pp. 44-73.

Ravi Sharma, "Distributed Application Development with Inferno", Inferno Network Software Solutions, Bell Laboratories, Lucent Technologies, 1999, ACM, 1-5.

James Donahue, "Integration Mechanisms in Cedar", Xerox Palo Alto Research Center, 1985, ACM 245-251.

Daniel C. Swinehart et al., "The Structure of Cedar", Xerox Palo Alto Research Center, 1985, ACM, 230-244.

\* cited by examiner

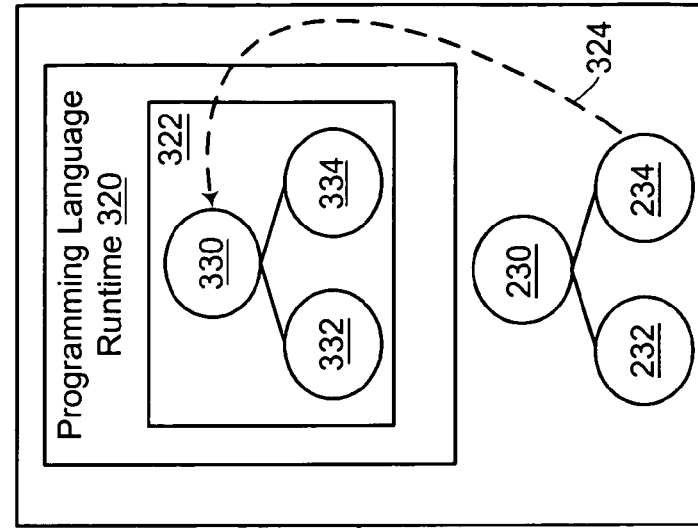
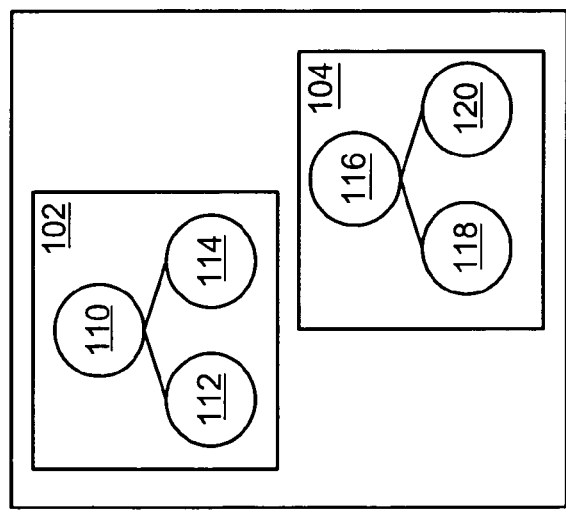
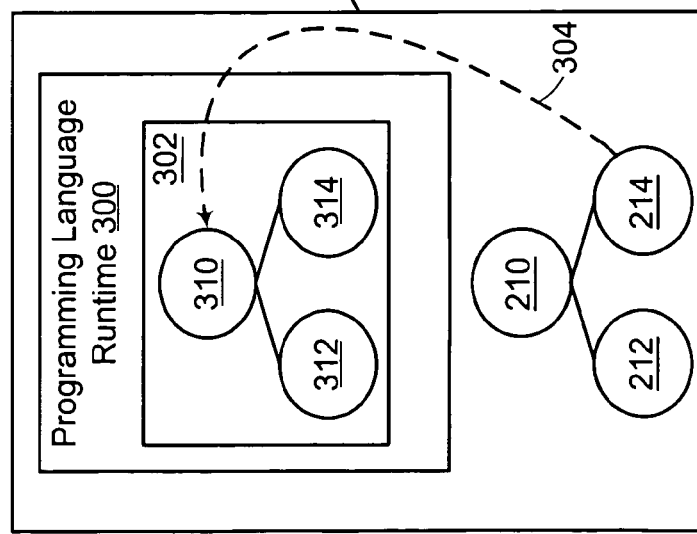
FIG. 1
PRIOR ART

METHOD AND APPARATUS FOR INTEGRATING A COMPUTER APPLICATION PROGRAMMING LANGUAGE RUNTIME ENVIRONMENT WITH AN OPERATING SYSTEM KERNEL

BACKGROUND OF THE INVENTION

This invention relates generally to process management in a computer system having an application programming language runtime and an operating system kernel, and more specifically to integrating the application programming language runtime and an operating system kernel in order to reduce memory and processing requirements and provide a secure process execution environment.

Several attempts have been made to integrate a programming language (and its runtime) with an operating system (OS). In typical systems application programming language and application programming language runtime are developed concurrently. The resulting systems enjoy the benefit of designing both the language and the OS together. Examples of these systems include: Cedar developed by Xerox Parc, Oberon developed at Zurich University and the Inferno OS developed by Lucent Technologies.

Cedar was spawned from an effort to create a combined hardware/software environment from which applications can be executed. The system is comprised of a hardware architecture and an operating system with an integrated programming language runtime. Cedar hosts a variety of personal applications. After an initial focus on proprietary hardware, the software was ported to general purpose hardware. The system targeted high end workstation hardware for use by professionals (e.g., engineers and office workers). While Cedar attempted to be an application programming language runtime with an operating system, it did so by designing the application programming language runtime together with an operating system. The combination did not specifically focus on reducing processing or memory usage.

Oberon was developed at the Swiss Federal Institute of Technology by Niklaus Wirth. Oberon had similar attributes to the Cedar system, it also began as a proprietary hardware/software platform. Again, the software was later ported to general purpose hardware. The system consisted of an OS and programming language designed together, with the intent of simplifying the language and software architecture. It was also designed for a high end workstation targeted for professionals. Oberon did not create a strong definition of application process separation, instead it encouraged the interaction of all applications to operate as one.

The Inferno OS was developed by Lucent Technologies and provides an operating system and programming language designed together to run on small networked devices intended to operate in a distributed computing environment. Inferno is yet another example of an OS and programming language being designed together and intended to operate only together. Inferno was designed as a distributed computing environment and was not object oriented.

SUMMARY OF THE INVENTION

The present invention provides a method and apparatus for combining an application programming language runtime environment with an operating system kernel. Typically, an application language runtime provides an application with a context that executes within a separate operating system (OS) process and the application simply calls into the functionality of the OS. In the present invention, the application language runtime environment is merged with the operating system kernel such that the typically distinct and separate OS process context is created on top of the combined runtime/OS system. An examination of the programming language and runtime system along with the features of the target operating system is performed in order to determine which resources of the programming language runtime and operating system can be shared. Aspects of each of the programming language runtime and operating system that resemble each other, or can be made to resemble each other, are identified. The data structures (classes) of the identified resources are merged, and access and management algorithms (methods) for the data structures are modified to accommodate the new data structures and to account for the sharing of the data structures.

In a preferred embodiment of the present invention, one or more of the following programming language runtime and OS resources are integrated: threading data structures and algorithms, synchronization primitives, process resource ownership container data structures, graphical interface components, I/O components and networking components.

In conventional systems, where there is a distinct separation of the programming language runtime data structures and the operating system data structures it is common to have multiple structures shadowing each other (i.e., one data structure is not fully useful without the other). Additionally, these systems often replicate information.

An exemplary programming language runtime (e.g., JVM) may have a concept of a thread which application programs makes use of. In conventional systems the programming language runtime will maintain a thread data structure that describes the thread features as needed by the programming language runtime. Further the programming language runtime will reference the underlying operating system thread resources (and indirectly the OS thread data structures).

The present invention provides merged data structures that contain the consolidation of information needed by the programming language runtime and the OS, with no duplication. Integrating resources of the programming language runtime and the operating system data structures and access methods can reduce the overall memory needed to store data structures associated with the resource. Additionally, overhead in maintaining two data structures in parallel is also reduced, thus reducing the processing required. Further, many of the core resources (e.g., threading operations) being consolidated, also reduce the processing required for common operations (e.g., thread suspend, resume, synchronizing, etc.). According to the principles of the present invention, the same techniques can be applied to other resource as well.

The present invention provides a method for integrating an application programming language runtime environment with an operating system kernel by providing distinct application processes for executing application programs. The application programming language runtime environment is shared with the distinct application processes. The application programming language runtime environment specification having been designed independent of the operating system kernel. Sharing comprising merging certain class data structures, meta-data structures and access methods of the application programming language runtime environment with class data structures, meta-data structures and access methods of the operating system kernel. The merging results in merged class data structures, merged meta-data structures and merged access methods. The distinct application processes are executed at Step 506 such that memory for storage of the merged class data structures, the merged class metadata structures and the merged class access methods, and processing to execute the merged class access methods are reduced.

Various specific resources of the application programming language runtime environment can be integrated including, threading system resources, process synchronization resources, process resource ownership resources, graphical user interface resource, input-output system resources and networking resources.

The application programming language runtime environment can include a security system. Semantic behavior can be shared between the application programming language runtime environment and operating system kernel such that untrusted application program code is prevented from escaping the application programming language runtime environment.

The present invention provides a number of advantages for computer application programs in terms of how, when, and where resources needed by the computer application programs are managed and used. In addition it provides for processes implemented according to the principles of the present invention to leverage the features of the programming language runtime and OS for protection and security. The present invention reduces memory requirements and processing requirements while at the same time supporting multiple separate application processes.

The present invention provides the ability to easily share common resources and object definitions (e.g., class or language construct describing a data structure) between application contexts.

The present invention also improves security of running application processes by adding the ability to create a protected and separate application processes. The application process/context leverages the protection capabilities of the OS, the protection rules of the application programming language and the protection capabilities of the application program language runtime. The present invention can additionally create a secure environment to protect computer systems from malicious external entities gaining access to local and unauthorized resources.

Support for an existing programming language runtime specification, designed separate from the underlying OS, and with the capability of executing on a completely independent OS is also provided by the present invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 1 is a diagram of a prior art system for executing an application process and a programming language runtime.

DETAILED DESCRIPTION OF THE INVENTION

Figure 2:
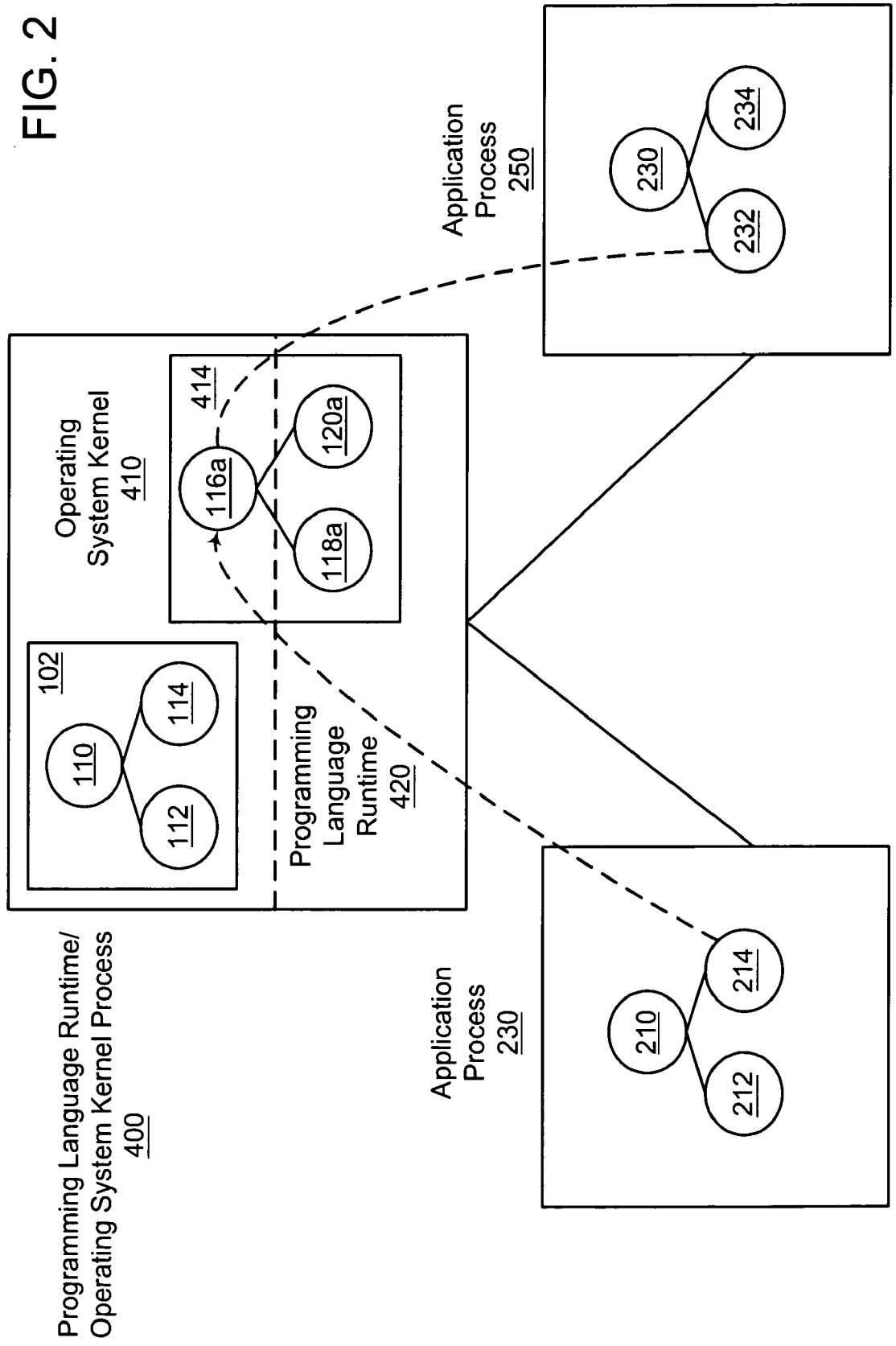
FIG. 2 is a diagram of an integrated application programming language runtime environment and operating system kernel environment.

A description of preferred embodiments of the invention follows. A preferred embodiment of the present invention is implemented as the SavaJe OS developed by SavaJe Technologies, 100 Apollo Drive, Chelmsford, Mass., USA, the assignee of the present invention. While the present invention is particularly shown and described with references to the SavaJe OS preferred embodiment, it will be understood by those skilled in the art that various changes in form and details may be made therein without departing from the scope and principles of the present invention.

Since the arrival several years ago of Sun Microsystems' Java™ technology with its concept of "write once, run anywhere" applications, developers have struggled to adapt Java to information appliances that have limited resources in a small footprint. The core platform for Java functionality is Java 2 Standard Edition, J2SE™, which is targeted at the desktop, operating interactively within an intranet or on the Internet. Information Appliances do not have the resources to run standard Sun Microsystems' J2SE with anything approaching acceptable performance. Java depends upon the structure of a Virtual Machine (VM) to deliver its concept of portability. Reference or optimized VMs, associated portability layers, classes and libraries normally run on top of a native operating system with its own portability layers, Application Programming Interfaces (APIs) and libraries. This creates performance and size issues on small footprint devices running Java.

To overcome this problem Sun Microsystems has promoted a range of subsets of Java under the overall name of the Java 2 Micro Edition, J2ME™. These subsets overcome the performance issue by restricting functionality, but in doing so remove the core Java value proposition that any Java program written for one client machine will run on another. While this restriction has not to date been too onerous, the emerging generation of smart wireless devices, advanced mobile phones, wireless PDA's, interactive web tablets and internet-enabled gaming machines require the complete application support and client functionality that 'full' Java provides. Moreover the fragmentation of Java into a variety of subsets, and individual 'flavors' from third-party providers of VM technology, has introduced global incompatibilities such that an application provided by one provider may run correctly on a wireless device from one manufacturer but not on those provided by another. The present invention provides solution to overcome the issues that prevent "full" Java from running on wireless handheld devices. By delivering a "Universal Java Client" platform that runs all APIs from all subsets of J2ME as well as all APIs from J2SE, the SavaJe OS overcomes both the performance and compatibility problems. With SavaJe OS a handheld wireless device or information appliance is enabled as a full Java client in the Internet or intranet environment.

SavaJe OS is not a Virtual Machine. Designed from the ground up to run Java applications optimally, SavaJe OS is built around a 32-bit, multi-threaded, multi-tasking, pre-emptive, fitfor-purpose kernel. The SavaJe OS includes an embedded Java Virtual Machine (JVM) that is tightly coupled to the operating system kernel, and a complete set of Java libraries. The API for the SavaJe OS is the full range of J2ME and J2SE APIs. SavaJe is a Sun commercial J2SE licensee. The SavaJe OS is fully Sun compliant and is Java branded.

SavaJe OS provides are a small, efficient kernel. Information appliances have less CPU power, memory, and external storage than desktop or server-class systems. As a result efficiency in the use of memory and processing power are important commodities. Application portability is provided by supporting the full range of standard Java 2 APIs, SavaJe OS extends the full functionality of Java to the information appliance world. While there are some concerns that must still be considered when writing applications for information appliances (e.g. the user interface, memory and storage limitations, and network connectivity), application programmers now have the complete and familiar J2SE libraries available. Applications written using SavaJe OS can take full advantage of the abstractions in the Swing and Java 2D APIs to provide a rich graphical experience. SavaJe OS supports a wide variety of screen dimensions, and color depths up to 32-bit. SavaJe OS provides strong and flexible security and delivers application integrity by building directly on Java's inherent security. By default, each application runs in a secure environment that includes its own security manager controlled by a security policy. Full network support provides full support for networking and distributed computing. Connectivity to corporate LANs, local wireless, cellular services, and Personal Area Network (PAN) connections such as Bluetooth is built into the SavaJe OS. Robust applications can be developed with standard Java APIs including RMI, CORBA, and JINI services. SavaJe OS provides far better applications performance in a substantially smaller memory footprint than any other PersonalJava, Personal Profile or J2SE Java implementation on a given hardware platform.

An application programmer's view of SavaJe OS shows that it specifically supports Java applications. The developer's view of SavaJe OS is simple. Any SE or ME app will run on or can be developed for SavaJe. Applications that run on SavaJe OS can be written using any one of the full range of Java APIs—from the Java 2 Micro Edition profiles, such as MIDP, MIDP 2.0 and Personal Profile, to the full rich environment of Java 2 Standard Edition. SavaJe has added optional applications services oriented extension Java APIs, making SavaJe OS the most complete Java client environment available. While SavaJe OS does not support end user applications written in other languages, there are provisions to allow 3rd party native modules written in C, C++ or assembler (drivers, media codecs, or arbitrary libraries) to be integrated into the SavaJe OS. These modules can then be exposed to applications via a suitable Java API.

An architectural view of SavaJe OS reveals that SavaJe OS provides J2SE Class Libraries, J2ME Class Libraries, a Java Virtual Machine, Native Methods, and an OS Kernel/Graphics/Networking/Drivers, running Java applications. The kernel, the graphics system, the JVM, and the Java native methods are tightly bound, allowing performance optimizations not possible in other "general-purpose" operating systems.

The kernel of SavaJe OS provides memory management services, resource locking, thread control and scheduling, and a device driver interface. In addition, the Java Virtual Machine is closely integrated with the kernel. Both the JVM and Java native methods can be considered as kernel-level resources. The kernel, JVM, and device drivers are statically bound. Device drivers, written to a standard interface, allow the kernel to communicate with peripherals, including keyboards, touch screens, and communication ports. Experience has shown that is a comparatively simple task to add existing native modules to the SavaJe OS. Developers may add native modules such as media codecs, or existing C libraries. To support this, SavaJe OS contains an extensive subset of ANSI C and POSIX APIs. Examples of 3rd party source modules include the Java VM itself, the FreeType font engine, the Beatnik Audio Engine, and the ZIP compression library. In some cases source code is not available when creating a SavaJe OS image. SavaJe OS is created with the industry standard GNU tool chain—compiler, linker, assembler, etc. This allows for binary code modules to be added to the SavaJe OS without access to source code. A binary created with these or similar tools can easily be integrated. In addition, SavaJe OS can in some cases link in other arbitrary modules of Advances RISC Machine (ARM) binary code.

To manage physical memory, SavaJe OS uses virtual addresses in a 4 GB address space. Physical memory is divided into 4 KB pages, managed through a two-level hierarchy. At the kernel level, memory is allocated through an efficient malloc( ) for most general uses. Some system objects such as monitors, locks and semaphores are allocated using memory blocks of fixed size. There are no heap size settings since all memory that is not used by the system or by the DRAM file system is available to Java programs.

The SavaJe OS is not a hard real time system. There are no provisions in the SavaJe OS to enforce real time deadlines that are needed for hard real time systems. Rather, the SavaJe OS performs tasks that are time critical to the end user, but not catastrophic—for example playing media can be time critical but missing a frame is not catastrophic to the system. The focus has been on developing a system that is capable of performing these end-user oriented time critical tasks. This may be classified as a soft real time system. One area of concern for key core modules is often that of interrupt dispatch. Measurements on commercially available hardware (206 MHz SA-1110) have shown the SavaJe OS system is capable of sustained processing of approximately 100,000 interrupts per second. This represents an approximate upper bound that will saturate the CPU. On the ARM architecture the use of Fast Interrupt reQuests (FIQs) would allow for more efficient interrupt dispatch. The SavaJe OS kernel is very flexible in allowing for developers to create system threads that can isolate themselves from the Java applications in order to perform sensitive operations. The results can then be passed up to a Java application.

The JVM in SavaJe OS is developed from Sun Microsystems' VM, but has been optimized for size, speed, and low-memory environments. The JVM runs a highly optimized byte code interpreter producing efficient code while conserving memory. The JVM garbage collector is a simple, efficient, mark and sweep garbage collector that uses handles for object references. The garbage collector is optimized for Java finalizers. There is a dynamically sized handle table and no object coalescing. The SavaJe OS JVM is interpretative and does not use JIT techniques. SavaJe OS creates less memory overhead than JIT-based systems. Applications that interact with the user or network typically run up to an order of magnitude faster and with a considerably smaller memory footprint than on other Java platforms. The corollary is that intensive computational tasks written in Java can benchmark slower than on a VM with a built in JIT compiler. The SavaJe OS thread model is implemented to directly support the Java threads API and semantics. A Java thread object is closely tied to a SavaJe OS thread. Non-Java threads are the exception in the SavaJe OS. The underlying thread scheduler implements a time-sliced pre-emptive, fixed-priority, round-robin scheduler. The highest priority ready thread always executes, and threads of equal priority execute in a round-robin fashion.

SavaJe OS can take advantage of any hardware acceleration available in the underlying platform. For example, SavaJe OS can utilize the ARM Jazelle core when available to execute relevant byte codes in hardware. However, experience has shown that most "real-Java" applications (as opposed to small midlets) benefit far more from the other architectural features of the SavaJe OS, than simply from VM acceleration. Sun Microsystems has recently announced the ongoing development of an optimized VM for J2ME CLDC, called the Project Monty VM. This is not a "full Java" VM but rather a next generation version of the original KVM for MIDP. As such this VM will help accelerate MIDP implementations where midlet performance is restricted by the KVM, but will not be usable "as is" for Personal Profile or J2SE platforms. SavaJe OS will incorporate features from Monty where benefit can be gained.

Since the SavaJe OS operates on platforms that do not necessarily include a hardware floating-point processor, a highly optimized software floating-point emulation library is included. In addition an optimized library supporting the intrinsic math functions is also provided. The SavaJe OS platform also uses integer math wherever possible to minimize performance issues commonly encountered with floating point code.

Similar to most modern operating systems, SavaJe OS launches each application in a distinct process, referred to as a JProc (Java Process). There are a number of unique attributes in the SavaJe OS process model related to Java. By default, a new JProc has the following characteristics: its own class loader and security manager; a private view of class fields (i.e., statics); its own view of Java system properties; graphics context and system threads (for various system-level functions).

These attributes guarantee that one executing application will not interfere with another. SavaJe OS provides separation between processes while at the same time maintaining a single VM instance and sharing the standard system classes (both Java standard classes and SavaJe OS system classes). This is accomplished by treating the VM as an integrated kernel-provided resource to JProcs. In a traditional VM implementation, the VM executes within an OS process context. In contrast, on SavaJe OS, the VM is a service provided to the process by the kernel. This service model is beneficial to the system in general because the VM code and data is loaded and initialized only once, during system initialization. Because SavaJe OS is an always-on operating system, system initialization is a rare occurrence.

SavaJe OS shares system classes across multiple JProcs. All Jprocs follow the Java 2 Class loader delegation model. In this model, classes are loaded via a hierarchy of class loaders. Each class loader, when first asked to load a class, attempts to delegate the task to its parent class loader. The top of the class loader hierarchy is the system class loader (also known as the null, the bootstrap, or the internal class loader). The system class loader is responsible for loading the standard Java classes and all the vendor implementation classes (i.e., the SavaJe OS system classes). Since the individual application class loader does not have to load the system classes, the cost of loading them is shared by all executing SavaJe OS applications. The result is far less memory consumed across the system, and less processing resources required to execute applications.

SavaJe OS security is built upon the standard Java security architecture. The following components play a part in the SavaJe security architecture: the Java Language, Java byte-code verification, Java Security Managers, Java Runtime, Java Jar packaging, Java Security Architecture, SavaJe process model and SavaJe user identity. The Java language contributes to security by providing a type safe language that prevents accidental or intentional access to arbitrary memory locations. In addition, the Java VM enforces language via a process known as byte-code verification. The Java Security Manager infrastructure and its consistent use by the Java Runtime are key components. A policy file that is supplied when the program is executed drives the security manager. Under SavaJe OS the system will start each process with a security manager installed. This mandates that a program be given a policy file. This forced creation of a security manager is a unique feature of the SavaJe OS, providing a stricter security environment than that of a conventional desktop Java application environment. In general, applications should be run with the security manager and given the desired set of permissions. However, under special circumstances (following an explicit action by the programs installer) SavaJe OS makes it possible to start applications without creating a security manager. This allows applications that must load their own security manager in order to execute properly. When a SavaJe OS device is in operation it has a single user identity. A device can support multiple user profiles but only one logged-in user at a time. The method by which this user identity is established is specific to the device. Examples include a user-entered password or a user supplied smart card.

The Java Security Architecture provides a number of tools to allow for the secure delivery of code to a device over an insecure network (e.g. mobile phone networks). The Java application execution model allows for Java Archives (JAR) files, which contain application code and data resources, to be digitally signed. The Java execution platform then will verify the originator of each JAR prior to executing the code. In addition the Java Cryptography Architecture (JCA), Java Cryptography Extension (JCE), and Java Secure Socket Extension (JSSE) provide APIs for implementing additional security. These APIs can allow for secure network connections and data encryption. This lays the foundation for implementing a very secure application delivery mechanism. In a wireless network this can be easily integrated with the carrier and/or service provider OTA delivery strategy.

The graphics subsystem is a key component of the SavaJe OS platform, playing a significant role in terms of performance and features. The target devices for the SavaJe OS platform are personal hand-held user-oriented devices with compelling graphical interfaces. The performance of a graphics subsystem is a function both of user perceptions and expectations. The interface must be reactive to the user's actions and provide good performance. Key goals of the SavaJe OS graphics subsystem include: immediate reaction to user input, optimized memory utilization, reduced CPU loading, close integration with Java 2 AWT/Swing, minimal software layers and support for a variety of hardware types. The SavaJe OS platform supports the high-level APIs of Java 2 AWT, Swing and Java2D.

The graphics subsystem is tightly integrated to the AWT semantics and object structure. This integration allows for many optimizations in both memory usage and processing. For example, many of the internal levels of indirection that are found in an AWT implementation on other platforms are not required in the SavaJe OS system. Information stored in many AWT objects is directly manipulated by the core graphics subsystem, rather than copied and/or translated between un-related software layers. This has the dual advantage of reducing the memory requirements of a high-level graphics component as well as cutting the processing time required to manipulate the component. The SavaJe OS platform is targeted at information appliances with varying screen sizes, levels of color support, types of graphics hardware, and distinct input methods. The graphics subsystem was designed to support a wide range of these hardware variations. By way of an example, while it contains low-level graphics drawing primitives executed in software, it can substitute any available hardware acceleration capabilities that are available. This has an additional advantage for developers—enabling a prototype graphics output device to be developed quickly, followed by incremental addition of hardware acceleration, a key benefit where time to market is critical.

Applications are able to access various media types via standard Java APIs (e.g. MIDP Multimedia Extensions (JSR-135) or the Java Media Framework (JMF) for audio/video). New media types may be added through protocol specific embedded Codecs. SavaJe OS supports: images (e.g., JPEG, GIF, PNG), audio (e.g., WAV, AU, MP3, MIDI) and video (e.g., MPEG4 with audio stream. The SavaJe OS allows media codecs implemented as native modules. Interaction with the controlling application is via the standard Java APIs, but the kernel can schedule codec threads in isolation from Java application threads. In addition the codec threads can interface directly to the graphics subsystem. This allows for efficient and timely processing of the media stream, even in the presence of Java application garbage collection cycles. The media support framework within the SavaJe OS provides the following: support for multiple media codecs, support for multiple media formats, buffering of media data (streaming or local access), buffering of decoded video frames, intelligent frame dropping and re-sync, interfaces to the graphics subsystem and interfaces to the SavaJe OS audio mixer.

A wide variety of file systems are supported. The file system architecture supports the following: all file systems are accessed via the standard Java APIs, dynamically-mountable file systems, file system implementation in Java or C, support for removable media and support for network file systems. The architecture consists of a core infrastructure implemented in Java as a high-level service. File systems can be dynamically mounted into a single namespace using a simple standard convention. File systems can be implemented as core kernel C modules within a simple Java wrapper, or entirely in Java. SavaJe OS contains five distinct types of file systems: a recoverable read-write RAM file system, a read-only flash based file system, a Microsoft-compliant FAT file system for removable compact-flash cards including disk drives and two network file systems—SMB, and a simple Web server based file system. The mounting convention is that all file systems are mounted at a root ("/") with a file system type specific name. Once mounted, a file can be universally accessed via a single namespace—for example: "/cf0/foo/bar.html". This namespace has the appearance of a UNIX-style file system, with properties similar to Microsoft UNC.

The SavaJe OS supports various connectivity options including short-range peripheral access, synchronization to PC or corporate server and Internet access. SavaJe OS supports a variety of protocols for the following connectivity solutions, including: Ethernet, 802.11 Wireless LAN, Packet Switched wireless networks (e.g., GPRS, CDMA 1xRTT, EDGE, UMTS), Bluetooth, IRDA, USB and Serial.

SavaJe OS provides support for standard protocols over IP networks. An IP network may consist of a home-network, corporate intranet, the Internet or a Peer to Peer connection. Connectivity can occur over a wired Ethernet, a wireless 802.11 Ethernet, or a PPP Link. A PPP link can be established over a standard raw-serial link, IRDA, Bluetooth, or USB connections. Alternatively a network connection can be established over the various cellular wireless technologies such as CDMA, GPRS or UMTS. Java APIs are used to access the network. In general uses the standard Java Socket APIs. Additional industry defined specific Java APIs are supported, e.g. JSR-82 for Bluetooth.

In the SavaJe OS the TCP stack is an efficient implementation optimized for client use. The expectation is that a SavaJe-driven device is a personal, handheld unit. This does not preclude it from functioning as a server, but recognizes the fact that the target device is an end-user node not a large server-oriented appliance. This allows for various size/speed optimizations to be performed, resulting in a reliable, very efficient network access layer.

On the SavaJe OS a Java application can make use of raw TCP or UDP sockets to implement its own application level protocols. In addition application level protocols such as HTTP, POP, SMTP, etc can be utilized. For advanced, distributed applications SavaJe OS provides the Java APIs for RMI, CORBA, JNDI, JDBC and JINI. This full range of application support allows SavaJe OS to function as a powerful node on the network.

SavaJe OS 2.0 supports Personal Area Networking (PAN) via Bluetooth and IRDA. PAN is useful for quick short-range information transfer between two devices. Support for application registration and discovery is provided by the SavaJe OS. Applications can then use standard Java APIs to utilize OBEX, vCard and vCal as well as connections to devices such as headsets or PDA/laptops.

SavaJe OS 2.0 includes full support for industry standard SyncML client data synchronization. Various object types including vCard and iCal are used for synchronization to the built in PIM functions. This enables synchronization to a wide variety of industry standard server solutions.

SavaJe OS 2.0 provides a services architecture that offers infrastructure for a number of core services. A service is a high-level system component that contains no user interface and may provide functionality to one or more user applications and/or other system components. The service framework is a simple, flexible message routing mechanism. Certain services are created at system startup and are critical to proper system behavior. Others are started on demand when needed.

In a modern OS there are a number of operations that periodically occur which are of interest to higher-level components or to end-user applications. These operations are presented as events. System components or applications can register interest in various events and are notified when they occur. The event system is flexible and can be extended. The following are examples of event types: dynamic device introduction/removal (i.e. CF Card insertion), network connection and battery status (low/charging).

A document manager service presents applications with a simple access mechanism for all available files over a number of installed file systems. Within each file system the document manager will maintain a set of managed files.

Files will be managed based on type. This frees applications from traversing multiple file systems. In addition it can hide the various file systems and their directory structure from the end user. When new file systems are mounted the document manager automatically discovers any previous managed files and adds them to its working set.

Applications can make use of a messaging service that handles the low level details of delivering various forms of user level messages—email, SMS, MMS and IM. This facility enables applications to be developed with messaging features without concern for the lower level detailed functionality. For example a browser may have a send Viewed Page feature, yet an email client contains message creation, send and view features. Both applications can utilize the messaging service. This encourages developer creativity in the application GUI without any need to modify the core messaging functionality.

There are times when the system, system components, or applications need a simple and consistent way to provide information to the end user. The Info Service answers this requirement. According to the circumstances this information may interrupt the user's current activity, may require immediate response, or may be ignored by the user. The OS service provides this functionality without requiring the information generator to be aware of the exact presentation of the information for any given device.

The user interface of a device is critical to the successful adoption of a wireless device. The SavaJe OS is designed to provide a flexible infrastructure upon which device makers can provide their own value-add interfaces. SavaJe OS can be shipped with: device specific/custom UI, SavaJe Smart-Phone Reference UI, SavaJe Pen Reference UI and/or SavaJe Web Terminal Reference UI. The SavaJe OS can be simply configured to use a UI that replaces any of the reference SavaJe provided UI's. This allows a customer to take full control of the UI specification and implementation. All SavaJe-provided Reference U's contain features that allow for OEM/Operator/end-user customization. Such customizations can be end-user themes or skins, operator fixed or OTA-delivered branding, or OEM branding. The SmartPhone UI is appropriate for advanced wireless handsets that include numeric keypad, color screens (typically 208×176 to 320×240 pixel resolution), and no pen/mouse. The Pen UI is appropriate for pen-based tablet devices (typically 320×240 to 640×480) with hardware or software keyboards and handwriting recognition. Finally, the Web Terminal UI is intended for a large screen device (typically 640×480 to 1280×1024) with a keyboard and pointing device (pen, mouse, or a combination). It is also possible for a given device to support multiple U's that are available in certain configurations.

Each UI is composed of a GUI presentation layer and interface to a common core engine. The core engine handles the tasks of managing installed applications, including: what applications can be started, where the applications reside, what icons are associated with the applications, and how to launch the applications. This allows GUI presentation layer designer to be concerned with the details of how to present the information to the user and not with the mechanics of actually installing or launching the applications. The core engine is based on the Java JNLP specification and is compatible with both J2ME MIDP 2.0 OTA specifications, as well as the J2SE paradigm for client applications management. This meets the requirements for OTA application provisioning specified by individual wireless carriers. In addition, the core GUI engine also manages locally installed applications.

In addition to Applications Provisioning and Management SavaJe OS includes capabilities to patch the OS from a connected server. This enables OTA upgrades and patches to be delivered, securely, to customers without the requirement for expensive handset recalls or upgrades. In addition, complete OS replacement can be carried out through a high speed network connection or using a memory card (if available).

FIG. 1 is a diagram of a prior art system for executing an application process and a programming language runtime. Application process 200 (containing classes 210, 212, 214), 220 (containing classes 230, 232, 234) contain programming language runtime 300, 320 entirely within its single process. All OS resources 102 (containing classes 110, 112 and 114), 104 (containing classes 116, 118, 120) of the operating system kernel process are distinctly separate and exist outside of the application process 200, 220. Further, in this convention programming language runtime environment, application language runtime resources 302 (containing classes 310, 312, 314), 322 (containing classes 330, 332, 334) exist entirely within the context/process of the application language runtime 300, 320 for each application process 200, 220. An application process 200, 220 class (e.g., 214, 234) interfaces with a programming language runtime 300 class (e.g., 310, 330) by way of a call 304, 324 to the programming language runtime 300 within application process 200, 220. In the prior art each application process 200, 220 receives its own unique copy of the programming language runtime 300, 320 and all programming language runtime classes 310, 312, 314 and 330, 332, 334 will each consume their own entirely separate set of OS resources.

FIG. 2 is a diagram of an integrated application programming language runtime environment and operating system kernel environment. A distinct and separate application processes 230 (containing classes 210, 212, 214) and 250 (containing classes 230, 232, 234) are provided for running application programs. However, the programming language runtime 420 is now integrated with operating system kernel 410 to provide a programming language runtime/operating system kernel process 400. The programming language runtime 420 is shared across all application processes (e.g., application process 230 and application process 250) running within the programming language runtime/operating system kernel process 400. The data structures (classes) and resources (e.g., resource 414) containing integrated classes 116*a*, 118*a*, 120*a*, and other system classes, now are shared among application processes (e.g., application process 230, 250). Other operating system kernel resources (e.g., resource 102 containing classes 110, 112, 114) can continue to run unaltered according to the principles of the present invention. In cases where data structures are specifically unique to an application process 230, 250, such as classes 210, 212, 214 in application process 230 and classes 230, 232, 234 in application process 250, the data structures are replicated. In a majority of cases the system runtime classes implement the functionality of the defined application programming language runtime 420 and are therefore common functionality used across the application processes 230, 250. A class as defined by the present invention is the code, the meta-data (describing the class), and the distinct data structure to hold context specific data. The application processes 230, 250 can all share the code, the meta-data and the data structures.

The normally separate class data structures of a language runtime system in the prior art and the corresponding support class data structures maintained by the operating system are merged in the present invention into a single class data structure and common set of class methods accessible to both the kernel and the language runtime.

In an object oriented language a class is a definition of an object's data and methods that act on that object. An object is an instance of the class in memory. Thus, for one class and there can be any objects, all of which have similar data structure and the same code to act upon those data structures. Each individual object can have different data contents. In some languages, the class can also contain mutable data of its own. In this case much there is one set of "class data" per class. Again, there is many objects, one class (and thus one set of class data). In the present invention preserves the expectation of each process seeing "one class" by providing each process with its own unique set of "class data", while sharing the class definition (e.g., data structure and meta-data which describe information about the class, and the class methods) across all processes. This provides the notion of one shared class where each process is given its own view. This is in contrast to prior art implementations where each process replicates all bits of information.

The integration of the application programming language runtime environment with the operating system kernel provides for greatly reduced overall memory consumption and processing for systems that execute two or more applications written for the same application language runtime environment.

Figure 3:
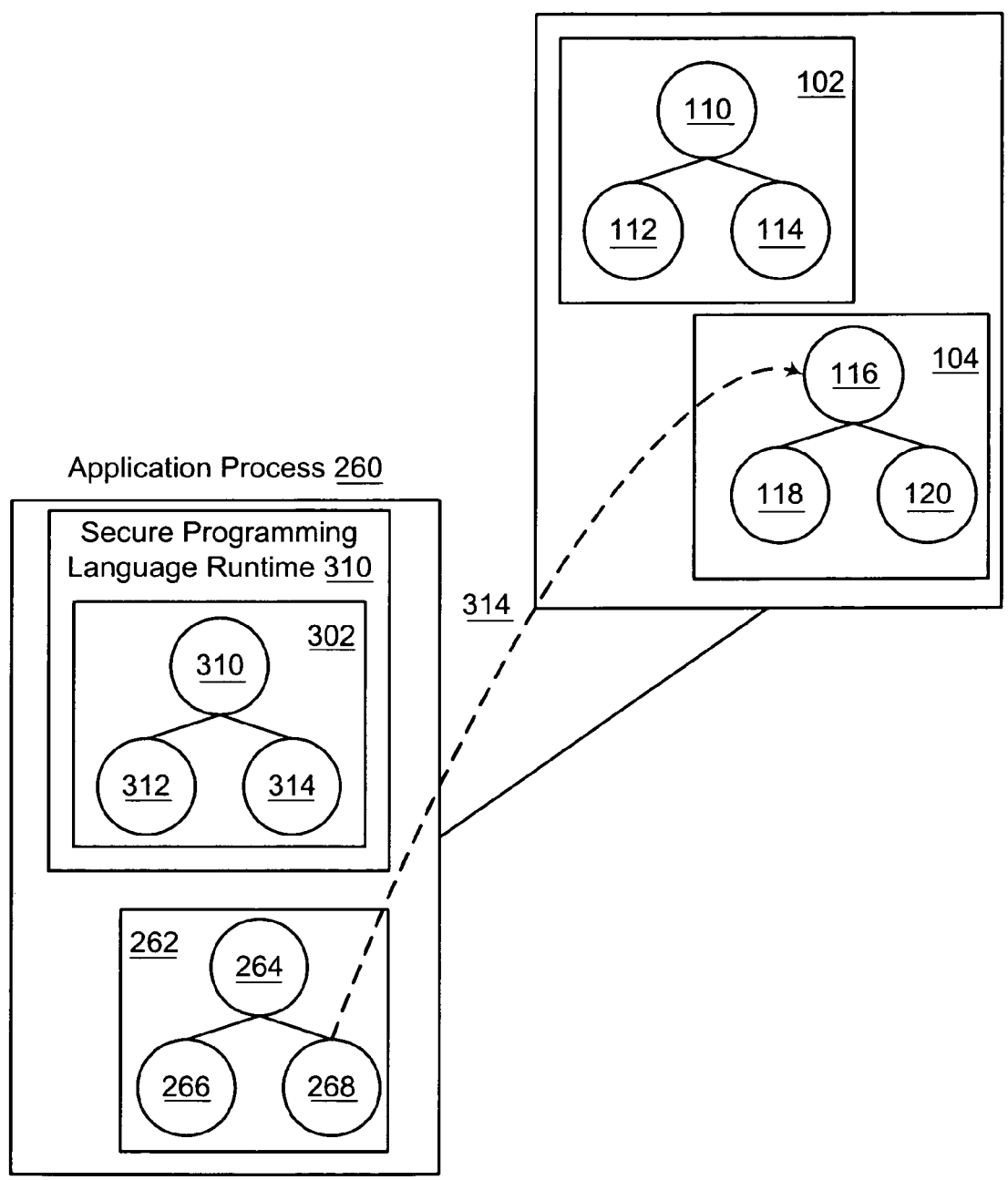
FIG. 3 is a diagram of a prior art system for executing an untrusted application process 262 in a separate programming language runtime and operating system kernel environment.

FIG. 3 is a diagram of a prior art system for executing an untrusted application process 262 in a separate programming language runtime and operating system kernel environment. In cases of untrusted, or suspect, code (e.g., untrusted code 262) it is desirable to execute the untrusted code 262 (containing classes 264, 266, 268) within a secure version of an application language runtime system 310. Implementing a secure application programming language runtime environment 310 within an operating system that does not have any specific knowledge of the application programming runtimes requires implementing a secure application programming language runtime 310 within the operating system kernel process 100. The operating system kernel process 100 may, or may not, be secure on its own, but from the secure application programming language runtime's 310 perspective it must implement its own security to meet the semantic requirements of its own programming language definition. Since application process 260 can contain its own execution context, any code escaping the secure application programming language runtime 310 (perhaps through a call 268 into a library not within the secure application programming language runtime 310) will still execute within the context of the application process and thus escape the secure application programming language runtime 310 environment. Such a call 268 can compromise the security of the computer system if untrusted code 262 were to perform malicious operations.

Figure 4:
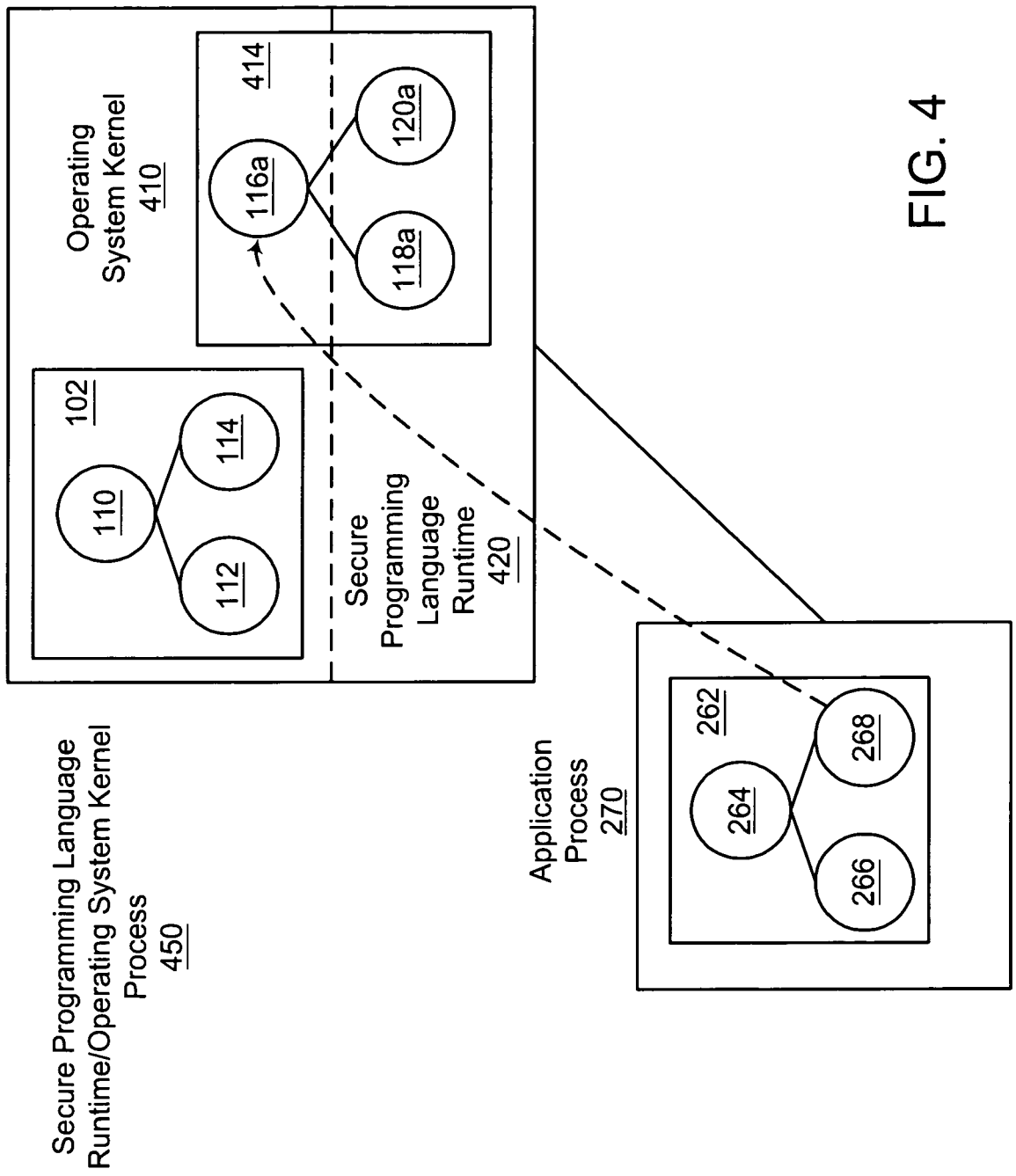
FIG. 4 is a diagram of an integrated secure application programming language runtime environment and operating system kernel environment.

FIG. 4 is a diagram of an integrated secure application programming language runtime environment and operating system kernel environment. Making use of the above described advantages of the integrated application programming language runtime environment and operating system kernel environment provides sharing of semantic behavior of the environments (e.g., security semantics). This provides for the integrated application programming language runtime environment and operating system kernel environment becoming an integrated secure application programming language runtime and operating system kernel environment 450. Each application process running within this integrated secure application programming language runtime and operating system kernel environment 450 is as secure as the operating system kernel's and application programming language runtime's combined functionality provides. Untrusted, or suspect, code can be executed within this integrated secure application programming language runtime and operating system kernel environment 450, and there can be no escaping of untrusted code 262 since all execution of the untrusted code 262 occurs within the context of an application process 270 which is it self running within the integrated secure application programming language runtime and operating system kernel environment 450. In this way, it is shown that integrating a secure application programming language runtime 420 and operating system kernel 410 not only reduces memory and processing requirements, but provides security advantages when executing untrusted code. Because the security is based on the programming language defined semantics, the same untrusted code 262 is portable across any implementation of the secure application programming language runtime 420. The integrated secure application programming language runtime and operating system kernel environment 450 requires no changes to application code.

Figure 5:
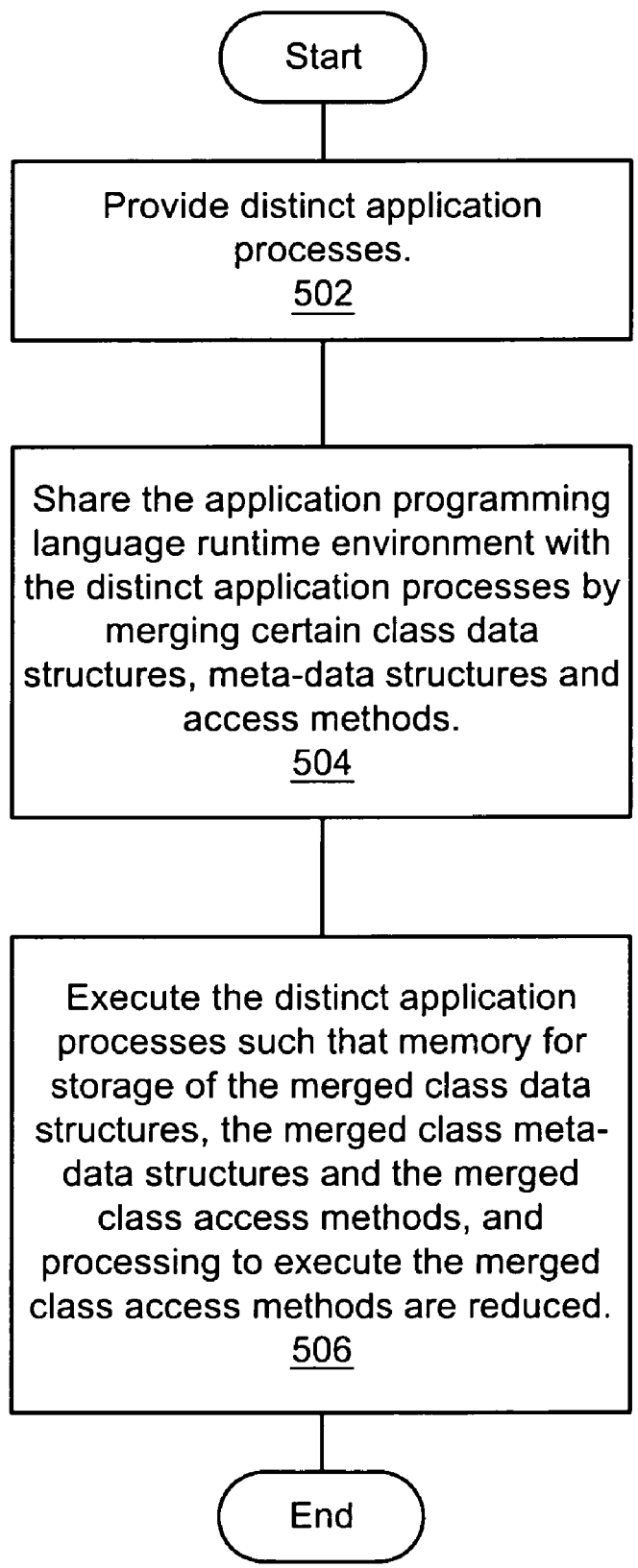
FIG. 5 is a flow diagram of a method for integrating an application programming language runtime environment with an operating system kernel according to the present invention.

FIG. 5 is a flow diagram of a method for integrating an application programming language runtime environment with an operating system kernel according to the present invention. Distinct application processes for executing application programs are provided at Step 502. At step 504 the application programming language runtime environment is shared with the distinct application processes. The application programming language runtime environment specification is designed independent of the operating system kernel. The sharing comprising merging certain class data structures of the application programming language runtime environment with class data structures of the operating system kernel, this merging resulting in merged class data structures. Additionally, merging certain class meta-data structures of the application programming language runtime environment with class meta-data structures of the operating system kernel, this merging resulting in merged class meta-data structures. Further, merging certain class access methods of the application programming language runtime environment with class access methods of the operating system kernel, said merging resulting in merged class access methods. At step 506 executing the distinct application processes such that memory for storage of the merged class data structures, the merged class meta-data structures and the merged class access methods, and processing to execute the merged class access methods are reduced.

Figure 6:
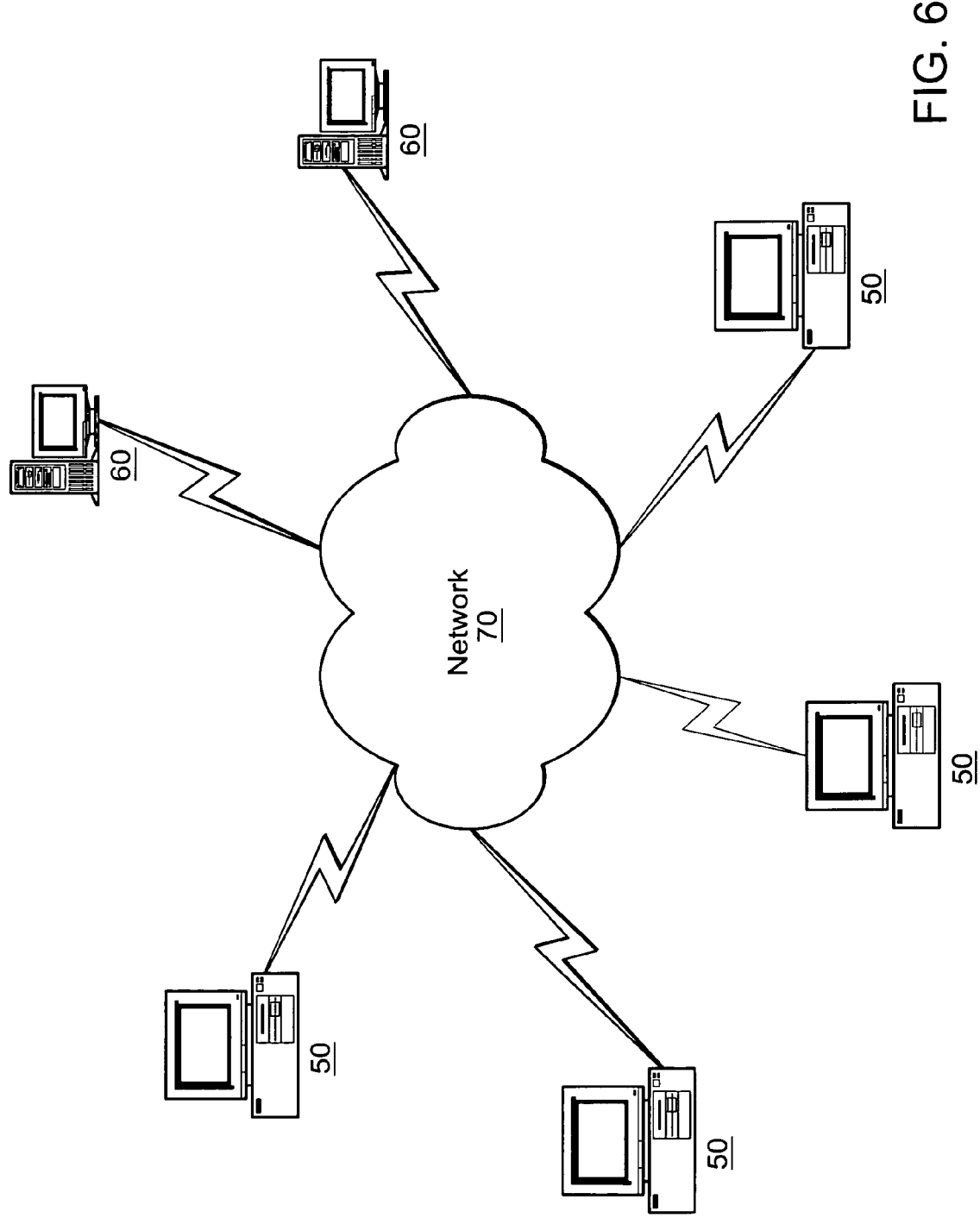
FIG. 6 is a diagram of a computer system in which an embodiment of the present invention is implemented.

FIG. 6 is a diagram of a computer system in which an embodiment of the present invention is implemented. Client computer 50 and server computer 60 provide processing, storage, and input/output devices for integrating an application programming language runtime environment with an operating system kernel. The client computers 50 can also be linked through a communications network 70 to other computing devices, including other client computers 50 and server computers 60. The communications network 70 can be part of the Internet, a worldwide collection of computers, networks and gateways that currently use the TCP/IP suite of protocols to communicate with one another. The Internet provides a backbone of high-speed data communication lines between major nodes or host computers, consisting of thousands of commercial, government, educational, and other computer networks, that route data and messages. In another embodiment of the present invention, integrating an application programming language runtime environment with an operating system kernel can be implemented on a stand-alone computer.

Figure 7:
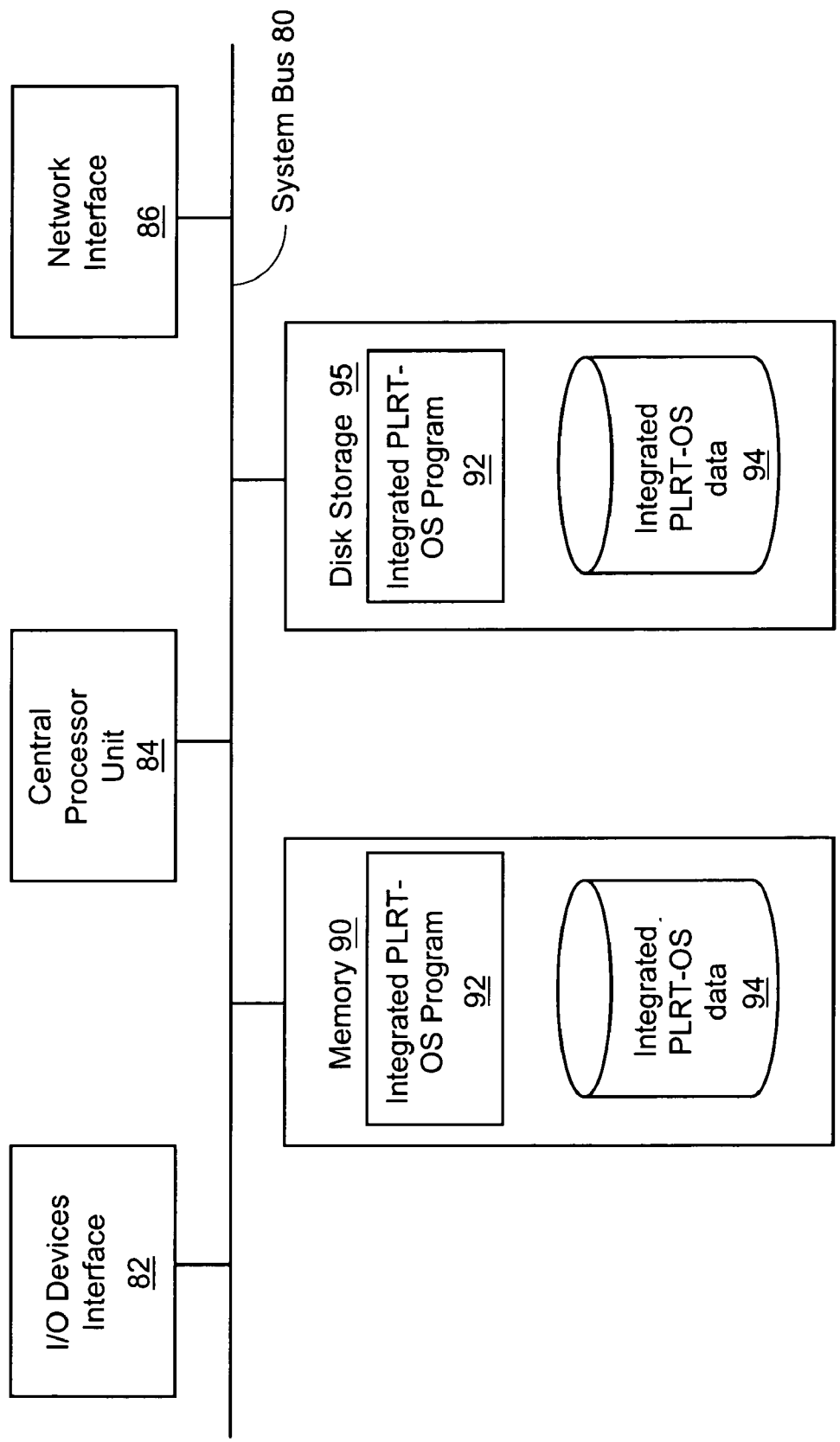
FIG. 7 is a diagram of the internal structure of a computer in the computer system of FIG. 6.

FIG. 7 is a diagram of the internal structure of a computer (e.g., 50, 60) in the computer system of FIG. 6. Each computer contains a system bus 80, where a bus is a set of hardware lines used for data transfer among the components of a computer. A bus 80 is essentially a shared conduit that connects different elements of a computer system (e.g., processor, disk storage, memory, input/output ports, network ports, etc.) that enables the transfer of information between the elements. Attached to system bus 80 is an I/O device interface 82 for connecting various input and output devices (e.g., displays, printers, speakers, etc.) to the computer. A network interface 86 allows the computer to connect to various other devices attached to a network (e.g., network 70). A memory 90 provides volatile storage for computer software instructions integrating an application programming language runtime environment and operating system kernel (PLRT-OS) (e.g., PLRT-OS program 92 and PLRT-OS data 94) used to implement an embodiment of the present invention. Disk storage 95 provides non-volatile storage for computer software instructions and data (e.g., PLRT-OS program 92 and PLRT-OS data 94) used to implement an embodiment of the present invention.

A central processor unit 84 is also attached to the system bus 80 and provides for the execution of computer instructions (e.g., PLRT-OS program 92 and PLRT-OS data 94), thus providing for integrating an application programming language runtime environment with an operating system kernel.

While this invention has been particularly shown and described with references to preferred embodiments thereof, it will be understood by those skilled in the art that various changes in form and details may be made therein without departing from the scope of the invention encompassed by the appended claims. Specifically, a preferred embodiment of the present invention is implemented as the SavaJe OS. The scope of the present invention encompasses integration of an application programming language runtime context with an operating system kernel context and is not limited to the SavaJe OS. Additionally, any application programming language runtime and operating system kernel can be integrated using the method and apparatus of the present invention, the present invention is not limited to the Java language, nor its corresponding Java Virtual Machine (JVM) application programming language runtime.

What is claimed is:

1. A method for integrating an object oriented application programming language runtime environment with an operating system kernel, comprising:
  (a) providing distinct application processes for executing application programs;
  (b) sharing the application programming language runtime environment with the distinct application processes, the application programming language runtime environment specification designed independent of the operating system kernel, the sharing comprising:
  merging certain class data structures of the application programming language runtime environment with class data structures of the operating system kernel, said merging resulting in merged class data structures;
  merging certain class meta-data structures of the application programming language runtime environment with class meta-data structures of the operating system kernel, said merging resulting in merged class meta-data structures; and
  merging certain class access methods of the application programming language runtime environment with class access methods of the operating system kernel, said merging resulting in merged class access methods; and
  (c) executing the distinct application processes such that memory for storage of the merged class data structures, the merged class meta-data structures and the merged class access methods, and processing to execute the merged class access methods are reduced.

2. The method of claim 1 wherein the application programming language runtime environment comprises a threading system resource.

3. The method of claim 1 wherein the application programming language runtime environment comprises a resource for a process synchronization system.

4. The method of claim 1 wherein the application programming language runtime environment comprises a resource for a process resource ownership system.

5. The method of claim 1 wherein the application programming language runtime environment comprises a resource for a graphical user interface system.

6. The method of claim 1 wherein the application programming language runtime environment comprises a resource for an input-output system.

7. The method of claim 1 wherein the application programming language runtime environment comprises a resource for a networking system.

8. The method of claim 1 wherein the application programming language runtime environment comprises a security system, the application programming language runtime environment and operating system kernel environment sharing semantic behavior such that untrusted application program code is prevented from escaping the application programming language runtime environment.

9. An integrated object oriented application programming language runtime environment and operating system kernel computer apparatus, comprising:
  distinct application processes for executing application programs;
  the application programming language runtime environment shared with the distinct application processes, the application programming language runtime environment specification designed independent of the operating system kernel;
  shared classes comprising:
    merged class data structures of the application programming language runtime environment and class data structures of the operating system kernel;
    merged class meta-data structures of the application programming language runtime environment and class meta-data structures of the operating system kernel; and
    merged class access methods of the application programming language runtime environment and class access methods of the operating system kernel; and
  (c) a processor executing the distinct application processes such that memory for storage of the merged class data structures, the merged class meta-data structures and the merged class access methods, and processing to execute the merged class access methods are reduced.

10. The computer apparatus of claim 9 wherein the application programming language runtime environment comprises a threading system resource.

11. The computer apparatus of claim 9 wherein the application programming language runtime environment comprises a resource for a process synchronization system.

12. The computer apparatus of claim 9 wherein the application programming language runtime environment comprises a resource for a process resource ownership system.

13. The computer apparatus of claim 9 wherein the application programming language runtime environment comprises a resource for a graphical user interface system.

14. The computer apparatus of claim 9 wherein the application programming language runtime environment comprises a resource for an input-output system.

15. The computer apparatus of claim 9 wherein the application programming language runtime environment comprises a resource for a networking system.

16. The computer apparatus of claim 9 wherein the application programming language runtime environment comprises a security system, the application programming language runtime environment and operating system kernel environment sharing semantic behavior such that untrusted application program code is prevented from escaping the application programming language runtime environment.

17. An integrated object oriented application programming language runtime environment and operating system kernel computer apparatus, comprising:
    means for providing distinct application processes for executing application programs;
    means for sharing the application programming language runtime environment with the distinct application processes, the application programming language runtime environment specification designed independent of the operating system kernel, the sharing comprising:
    means for merging certain class data structures of the application programming language runtime environment with class data structures of the operating system kernel, said merging resulting in merged class data structures;
    means for merging certain class meta-data structures of the application programming language runtime environment with class meta-data structures of the operating system kernel, said merging resulting in merged class meta-data structures; and
    means for merging certain class access methods of the application programming language runtime environment with class access methods of the operating system kernel, said merging resulting in merged class access methods; and
    means for executing the distinct application processes such that memory for storage of the merged class data structures, the merged class meta-data structures and the merged class access methods, and processing to execute the merged class access methods are reduced.

18. A computer program product comprising:
    a computer usable medium for integrating an object oriented application programming language runtime environment with an operating system kernel;
    a set of computer program instructions embodied on the computer usable medium, including instructions to:
    (a) provide distinct application processes for executing application programs;
    (b) share the application programming language runtime environment with the distinct application processes, the application programming language runtime environment specification designed independent of the operating system kernel, the sharing comprising:
    merge certain class data structures of the application programming language runtime environment with class data structures of the operating system kernel, said merging resulting in merged class data structures;
    merge certain class meta-data structures of the application programming language runtime environment with class meta-data structures of the operating system kernel, said merging resulting in merged class meta-data structures; and
    merge certain class access methods of the application programming language runtime environment with class access methods of the operating system kernel, said merging resulting in merged class access methods; and
    (c) execute the distinct application processes such that memory for storage of the merged class data structures, the merged class meta-data structures and the merged class access methods, and processing to execute the merged class access methods are reduced.

* * * * *